May 23, 1967 — R. J. GORMAN — 3,321,145
CARBIDE TIPPED CHIPPER
Filed Oct. 21, 1965

*INVENTOR.*
RAYMOND J. GORMAN
BY Whittemore,
Hulbert & Belknap
ATTORNEYS

United States Patent Office 3,321,145
Patented May 23, 1967

3,321,145
CARBIDE TIPPED CHIPPER
Raymond J. Gorman, Birmingham, Mich., assignor to H & G Tool Co., Warren, Mich., a corporation of Michigan
Filed Oct. 21, 1965, Ser. No. 499,746
13 Claims. (Cl. 241—189)

This application is a continuation-in-part of applicant's copending application Ser. No. 235,196, filed Nov. 5, 1962, now Patent No. 3,214,106.

The invention relates to chipping machines for cutting up of brush or the like and refers more particularly to a chipping machine including a carbide tipped cutter blade and a pressure bar assembly including a pressure bar having a carbide insert and a cutter bar having a carbide cutting edge related to provide increased cutting efficiency and longer maintenance free operation of the chipping machine.

Brush chipping machines are known and are readily obtainable from companies, such as the Asplundh Chipper Company, 505 York Road, Jenkintown, Pa. The known chipping machines are provided with a rotatable cylinder having a chipper blade secured thereto which operates in conjunction with a pressure plate or bar and a cutter bar to chip brush and the like positioned between blade and bar.

Such operation produces considerable pressure between the cutter blade, pressure bar and cutter bar so that wear and breakage of the cutter blades, pressure bars and cutter bars is quite pronounced. The cost of replacing the cutter blades, pressure bars and cutter bars is a major expense in operation of known chipping machines.

It is therefore one of the purposes of the present invention to provide improved chipper machine structure.

Another object is to provide chipper machine structure including a rotating cylinder, a chipper blade secured to the cylinder for rotation therewith, a pressure bar assembly positioned adjacent the cylinder including a pressure bar and a cutter bar and means for reducing wear and maintenance of the chipper blade, pressure bar and cutter bar.

Another object is to provide structure as set forth above wherein the means for reducing wear and maintenance includes a carbide cutting tip on the cutter blade.

Another object is to provide structure as set forth above wherein the means for reducing wear and maintenance includes a carbide cutting edge on the cutter bar.

Another object is to provide structure as set forth above wherein the means for reducing wear and maintenance includes a carbide insert in the pressure bar.

Another object is to provide an elongated substantially flat, generally rectangular cutter blade having a pair of substantially parallel surfaces with a bevelled outer edge surface extending therebetween having a recess therein including a side extending parallel to the parallel surfaces of the cutter blade and then transversely thereto and a carbide cutting tip secured within the recess including surfaces in surface-to-surface engagement with the recess surfaces and an outer bevelled edge forming a continuation of the bevelled edge of the cutter blade.

Another object is to provide a pressure bar assembly for use in brush chippers or the like including a bar holder, a pressure bar adjustably mounted on the bar holder having a recess in one edge thereof, a carbide insert positioned immediately adjacent the recess in the one edge thereof and a cutter bar secured within the recess in the pressure bar including a carbide cutting edge in engagement with the carbide insert in the pressure bar and extending outwardly of the one edge of the cutter bar with respect thereto.

Another object is to provide chipping machine structure which is simple in construction, economical to manufacture and efficent in use.

Other objects and features of the invention will become apparent as the description proceeds, especially when taken in conjunction with the accompanying drawings, illustrating a preferred embodiment of the invention, wherein.

Figure 1:
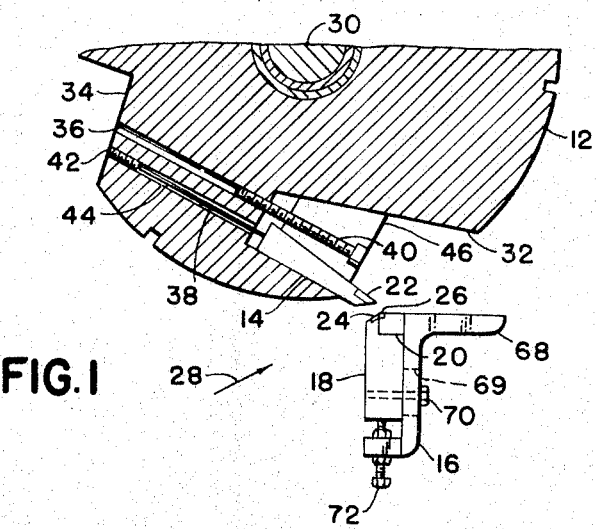
FIGURE 1 is a diagrammatic cross section view of a portion of a chipping machine including a cutter blade and a pressure bar assembly constructed and arranged in accordance with the invention.

The chipping machine 10, illustrated generally in FIGURE 1, includes a rotatable cylinder 12, a cutter blade 14 secured to the rotatable cylinder for rotation therewith and a cutter bar assembly 16 positioned adjacent the cylinder 12. The cutter bar assembly 16 includes the pressure bar 18 and cutter bar 20. The cutter blade 14 has the carbide cutting tip 22 secured thereto while the pressure bar 18 has the carbide insert 24 set therein and the cutter bar 20 carries the carbide cutting edge 26.

In operation brush is fed between the cylinder 12 and cutter bar assembly 16 in the direction of arrow 28 and is reduced to chips between the cutter blade and cutter bar. The carbide tip 22 on the cutter blade 14, the carbide insert 24 on the pressure bar and the carbide cutting edge 26 on cutter bar 20 provide increased efficiency of operation of the chipping machine 12 and reduce maintenance thereof.

The chipping machine 10 is not shown in its entirety since it is a known article of commerce. Only those portions thereof necessary to the disclosure of the invention are considered herein. Thus, the cylinder 12 is mounted to rotate about an axis 30 in bearings or the like in the usual manner and includes one or more axially extending recesses 32 spaced angularly thereabout for receiving the cutter blade 14. A second recess 34 is provided in conjunction with each blade receiving recess 32. Passages 36 and 38 in which the bolt 40, set screw 42 and adjusting pin 44 are positioned are provided between the recesses 32 and 34, as shown in FIGURE 1.

The cutter blade 14 which extends axially as well as radially of the cylinder 12 is adjusted to position the tip 22 thereof in an adjusted radial position with respect to the cylinder 12 by means of adjustment of the set screw 42 in the passage 38 to position the blade adjusting pin 44 which is in contact with the cutter blade 14. The cutter blade 14 is secured in the recess 32 by means of the blade locking wedge 46 which is locked in position by the bolt 40 threaded in passage 36.

Figure 2:
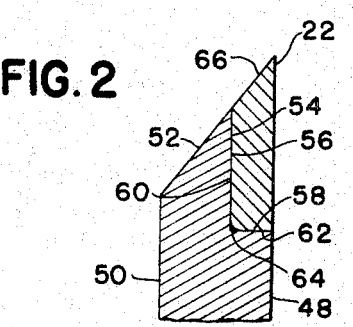
FIGURE 2 is an enlarged partial section view of a cutter blade constructed in accordance with the invention.
Figure 3:
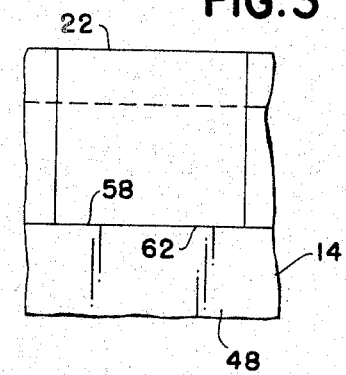
FIGURE 3 is a partial elevation view of the cutter blade illustrated in FIGURE 2 taken in the direction of arrow 3 in FIGURE 2.

The cutter blade 14, as shown in detail in FIGURES 2 and 3, is an elongated substantially flat, generally rectangular metal member having two substantially parallel spaced apart sides 48 and 50 and a beveled outer edge 52. A recess 54 is provided along the length of the cutter blade 14 and includes a side 56 extending parallel to and between the sides 48 and 50 and a side 58 extending transversely thereto, as illustrated best in FIGURE 2.

The carbide cutting tip 22 is positioned in the recess 54 and secured therein by convenient means, such as brazing. The surfaces 60 and 62 of the cutting tip 22 are parallel to the surfaces 56 and 58 of the recess 54 and in surface-to-surface engagement therewith. A bevelled transition surface 64 is provided therebetween. The edge surface 66 of the cutting tip 22 provides an extension of the bevelled edge 52 of the cutter blade 14.

As shown in FIGURE 3, the cutting tip 22 may be produced in sections of predetermined width. With such structure the entire cutting tip 22 need not be replaced when one section is worn or damaged.

The cutter bar assembly extends longitudinally of the cylinder 12 and includes the bar holder 68 in addition to the pressure bar 18 and the cutter bar 20. The bar holder 68 is provided with a slot 69 therein through which the bolt 70 extends for movement toward and away from the cylinder 12 of the chipping machine 10. The pressure bar 18 of the pressure bar assembly 16 may thus be adjusted radially of the cylinder 12 by means of the adjusting bolt 72.

The pressure bar 18, as shown in FIGURE 1, rests against the pressure bar holder and is in engagement with the adjusting bolt 72. The pressure bar 18 includes the recess 74 in the edge 76 thereof adapted to receive the cutter bar 20. Threaded opening 78 is provided in the recess 74 to receive the bolt 84 provided to secure the cutter bar 20 to the pressure bar 18. Recess 74 is dimensioned to cause the cutter bar 20 to extend slightly above the edge 76 of the pressure bar 18, as shown best in FIGURE 4.

A second recess 80 is provided in the edge 76 of the pressure bar 18 to receive the carbide insert 82. The carbide insert 82 prevents wear of the pressure bar adjacent the carbide cutting edge 26 of the cutter bar 20 and consequent excessive forces on the cutting edge 26 tending to cause separation of the carbide cutting edge 26 from the cutter bar 20.

Figure 4:
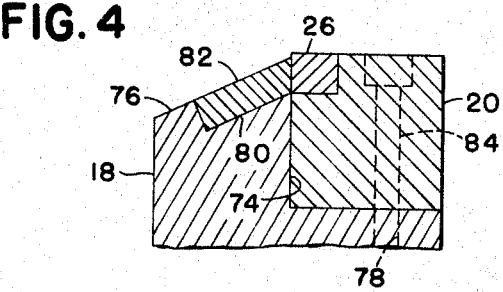
FIGURE 4 is an enlarged partial section view of the pressure bar assembly illustrated in FIGURE 1.

The cutter bar 20 is positioned in the recess 74, as illustrated in FIGURE 4, and may have one or more carbide cutting edges thereon. The cutter bar 20 is held in position on the pressure bar 18 by means of the bolt 84 extending therethrough and as indicated above is positioned above the edge 76 of the pressure bar 18 a short distance to provide a cutting edge 26 operable in conjunction with the cutting tip 22 on the cutter blade 14 which is very hard and wear resistant and which has no tendency to separate from the cutter bar due to excessive moment placed thereon by brush forced thereagainst on rotation of the cylinder 12 by the cutter blade 14.

In overall operation, as previously indicated, the cylinder 12 is rotated and brush fed in the direction of arrow 28 between the cutter blade 14 and the cutter bar assembly 18. The brush is thus compressed between the carbide cutting tip 22 and the carbide insert in the pressure bar 18 and is carried along the carbide insert 82 to be cut off at the carbide cutting edge on the cutter bar 26. Thus, substantially the entire chipping operation of the chipping machine 10 is accomplished between extremely hard wear resistant surfaces and edges which are constructed and arranged to prevent separation thereof from the cutter blade, pressure bar and cutter bar. The efficiency of the chipper 10 is thus greatly improved due to less maintenance and repair being necessary.

While one embodiment of the present invention has been considered in detail, it will be understood that other embodiments and modifications thereof are contemplated. It is the intention to include all embodiments and modifications as are defined by the appended claims within the scope of the invention.

What I claim as my invention is:

1. A chipper for chipping brush and the like, including a rotatable cylinder, a cutter blade secured to said cylinder for rotation therewith, a pressure bar assembly positioned adjacent said cylinder including a pressure bar having a carbide insert in the edge thereof and a cutter bar positioned adjacent said pressure bar whereby material positioned between the rotatable cylinder and pressure bar assembly is cut into chips on rotation of said cylinder.

2. A chipper for chipping brush and the like, including a rotatable cylinder, a cutter blade secured to said cylinder for rotation therewith having a carbide insert in the edge thereof, a pressure bar assembly positioned adjacent said cylinder including a pressure bar one edge of which is adjacent the cylinder having a recess therein and a cutter bar positioned within the recess and extending out of said recess a short distance toward said cylinder, and a carbide cutting edge on said cutter bar adjacent the pressure bar and extending below the edge surface of the pressure bar adjacent the cylinder.

3. Structure as set forth in claim 2 and further including a carbide insert in the edge surface of the pressure bar adjacent the cylinder in engagement with a portion of the carbide cutting edge of the cutter bar.

4. A chipper for chipping and the like comprising a rotatable cylinder having a recess in the periphery thereof, a pressure bar assembly positioned adjacent the cylinder, a cutter blade within and projecting outwardly from said recess including a substantially flat elongated body provided at its outer edge with an upwardly inclined portion and an outwardly opening recess, said recess in said cutter blade having a substantially flat longitudinally extending inner surface and having at the inner end of the longitudinally extending surface a transversely extending surface, said cutter blade being provided at its outer end with a carbide cutting tip for chipping material positioned between said rotatable cylinder and pressure plate during rotation of said rotatable cylinder, said cutting tip having substantially parallel inner and outer side surfaces and an inclined outer edge substantially in alignment with and forming a continuation of the corresponding edge of said cutter blade, means in said cylinder for adjusting said cutter blade to position said cutting tip in a predetermined position relative to the periphery of said cylinder, means in said recess in said cylinder for holding said cutter blade in an adjusted position, said pressure bar assembly including a pressure bar having one edge positioned adjacent said cylinder including a recess therein and a cutter bar extending along an edge of said pressure bar within the recess provided with an edge coacting with the cutting tip of the cutter blade to facilitate cutting of material placed between the cylinder and pressure bar assembly into chips during rotation of said cylinder.

5. Structure as set forth in claim 4 and further including a carbide cutting edge on said cutter bar and extending below the edge surface of the pressure bar adjacent the cylinder.

6. Structure as set forth in claim 5 and further including a carbide insert in the surface of the pressure bar adjacent the cylinder in engagement with a portion of the crbide cutting edge of the cutter bar.

7. A pressure bar assembly for use in chippers or the like including a bar holder, a pressure bar, means for adjustably supporting the pressure bar on the bar holder, said pressure bar having a bevelled edge including a longitudinally extending recess therein and a cutter bar positioned within said recess and extending slightly above the bevelled edge of the pressure bar having a carbide insert cutting edge.

8. Structure as set forth in claim 7 and further including a carbide insert carried by the pressure bar adjacent to and in contact with the carbide cutting surface of the cutting bar.

9. A chipper for chipping brush and the like, including a rotatable cylinder, a pressure bar assembly located adjacent said cylinder including a pressure bar and a cutter bar, a carbide insert secured to said pressure bar adjacent said cutter bar to prevent excess wear of the pressure bar during cutting on rotation of said rotatable cylinder, a cutter blade secured to said cylinder for rotation therewith and a carbide cutting tip secured to said cutter blade whereby material positioned between said rotatable cylinder and pressure bar assembly during the rotation of said rotatable cylinder, is cut into chips.

10. A chipper for chipping brush and the like, including a rotatable cylinder, a pressure bar assembly located adjacent said cylinder including a pressure bar and a cutter bar, a carbide insert secured to said pressure bar adjacent said cutter bar to prevent excess wear of the pressure bar during cutting on rotation of said rotatable cylinder, a cutter blade secured to said cylinder for rotation therewith, a carbide cutting tip secured to said cutter blade whereby material positioned between said rotatable cylinder and pressure bar assembly during the rotation of said rotatable cylinder, is cut into chips and carbide cutting edges secured to one or more edges of the cutter bar for coacting with the cutter blade to facilitate cutting during rotation of said rotatable cylinder.

11. A chipper for chipping brush and the like, including a rotatable cylinder, a cutter blade secured to said cylinder for rotation therewith, a pressure bar assembly located adjacent said cylinder including a pressure bar and a cutter bar, a carbide insert secured to said pressure bar adjacent said cutter bar to prevent excess wear of the pressure bar during cutting on rotation of said rotatable cylinder, said cutter bar being provided at one or more edges with separate carbide cutting edges for coaction with the cutter blade to facilitate cutting material positioned between said rotatable cylinder and pressure bar assembly into chips during rotation of said rotatable cylinder.

12. A chipper for chipping brush and the like including a rotatable cylinder, a cutter blade secured to said cylinder for rotation therewith, a pressure bar assembly positioned adjacent said cylinder including a pressure bar one edge of which is adjacent the cylinder having a recess therein and a cutter bar positioned within the recess and extending out of said recess a short distance toward said cylinder, and a carbide cutting edge on said cutter bar adjacent the pressure bar and extending below the edge surface of the pressure bar adjacent the cylinder.

13. Structure as set forth in claim 12 and further including a carbide insert in the edge surface of the pressure bar adjacent the cylinder in engagement with a portion of the carbide cutting edge of the cutter bar.

References Cited by the Examiner

UNITED STATES PATENTS

| | | | |
|---|---|---|---|
| 1,013,611 | 1/1912 | Peters | 146—118 X |
| 1,449,264 | 3/1923 | Cannard | 83—349 X |
| 1,973,169 | 9/1934 | Lelfield | 241—221 X |
| 2,671,947 | 3/1954 | Vander Linde | 143—133 X |
| 2,781,068 | 2/1957 | Anderson | 144—241 X |
| 2,857,111 | 10/1958 | Clark | 241—294 |
| 2,860,678 | 11/1958 | Condon | 146—117 |
| 2,873,923 | 2/1959 | Bergman | 241—294 X |
| 3,027,106 | 3/1962 | Brooks | 241—294 |
| 3,037,540 | 6/1962 | Bloomquist | 241—294 X |
| 3,040,794 | 6/1962 | Jacobsen | 146—118 X |
| 3,143,016 | 8/1964 | Obenshain | 83—349 X |
| 3,214,106 | 10/1965 | Gorman | 241—221 |

WILLIAM W. DYER, Jr., *Primary Examiner.*

ROBERT C. RIORDON, *Examiner.*

H. F. PEPPER, Jr., *Assistant Examiner.*